Jan. 17, 1928.  H. W. O'DOWD  1,656,529
GAS RANGE
Filed Feb. 7, 1925
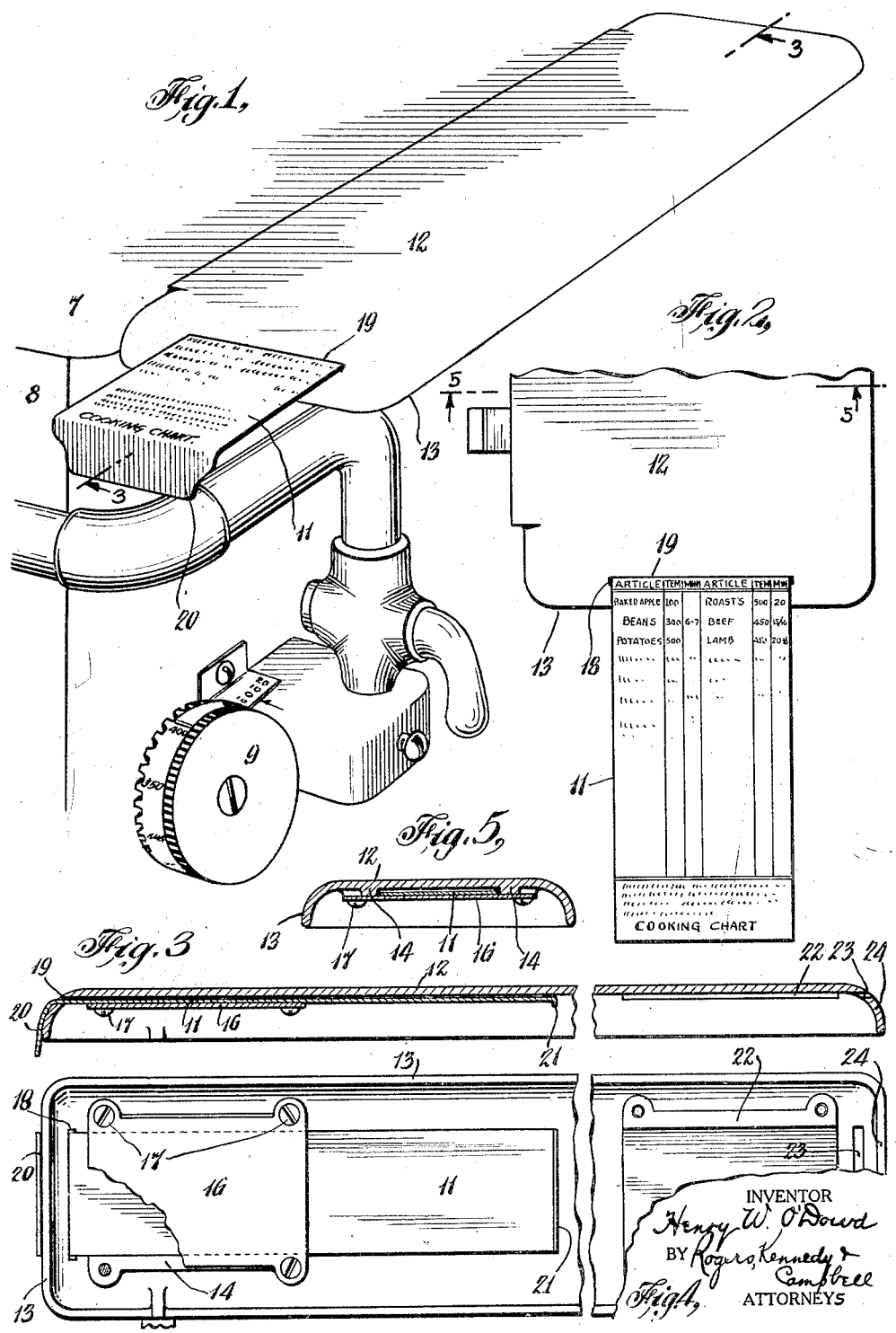
INVENTOR
Henry W. O'Dowd
BY Rogers, Kennedy & Campbell
ATTORNEYS Patented Jan. 17, 1928.

1,656,529

UNITED STATES PATENT OFFICE.

HENRY WATKINS O'DOWD, OF JERSEY CITY, NEW JERSEY, ASSIGNOR TO STANDARD GAS EQUIPMENT CORPORATION, A CORPORATION OF MARYLAND.

GAS RANGE.

Application filed February 7, 1925. Serial No. 7,455.

This invention relates to gas ranges provided with oven thermostats, and more particularly to the devices employed for controlling the operation of said thermostats.

In a common form of gas range of the character referred to, the operation of the thermostat is controlled by a dial in the form of a section of a cylinder marked on its trunk portion with the necessary temperature graduations or calibrations. In order that the dial may be set at the temperature required for the desired treatment of any particular food, the trunk of the dial is also charted with various foods, that is to say, the names of the foods are printed or otherwise indicated on the dial at the respective temperatures required for the various processes of cooking, as boiling, roasting, baking, etc. It is thus possible for the operator by looking at the dial to learn the temperature required for cooking a food in a particular way and then to set the dial at such temperature.

This form of dial has serious defects. For example, the spaces between the lines or marks indicating the different temperatures are arbitrarily determined by the heating capacity of the range and thus are also arbitrarily limited in the number of names of foods which can be printed in them. Crowding names into a small space makes it difficult to read them. Further, the dial being cylindrical, less than half the names are in view at any given time, and it is impossible to ascertain the temperature required for a desired purpose without turning the dial, which might be very undesirable when the range is in operation. Besides, in many installations, the location of the dial is such that it is difficult to see the graduations and printed matter at all, as, for example, when the dial is located on that side of the range which is contiguous to the kitchen wall. Again, the surface of the chart, being at all times exposed, is subject to the accumulation of dust and dirt, so that it is necessary to clean the chart frequently, and sometimes the printing on the chart becomes blurred and indistinct and, hence, difficult to read.

With the foregoing defects in mind, the present invention contemplates an independent cooking chart capable of containing a list of foods as complete as desired, together with their appropriate temperature indications, and such that, when not in use, it will be hidden away under cover and, when brought into use, all parts of its reading surface will be clearly visible at all times for use in connection with the manipulation of the thermostat dial. The dial itself need only be provided with the temperature graduations and indications, which latter may be greatly increased in size to facilitate the setting of the dial from the chart. These and other objects of the invention will in part be obvious and in part be more fully set forth in the following description.

The invention consists in the novel parts, combinations and features of construction herein shown and described.

In the drawings which are shown herewith and form part hereof is illustrated a preferred embodiment of the invention, the same serving in connection with the description herein to set forth the invention and to explain the principles thereof.

Of the drawings:—

Fig. 1 is a perspective view, parts being broken away, of a gas range equipped with a thermostat and a cooking chart to be used in connection therewith in accordance with the invention, the chart being shown as partly concealed under the shelf of the range;

Fig. 2 is a plan view of the chart and a portion of the shelf shown in Fig. 1, the chart being shown fully exposed;

Fig. 3 is a fragmentary longitudinal section taken on the line 3—3 of Fig. 1, parts being broken away, and shows the chart in fully retracted or covered position under the shelf of the range and the means used for holding the chart in its various positions;

Fig. 4 is a plan view bottom up, parts being broken away, of the shelf shown in Fig. 1, showing in detail the means employed for holding the chart under the shelf top and permitting the chart to be moved back and forth from under said shelf; and Fig. 5 is a cross section taken on the line 5—5 of Fig. 2.

Referring in detail to the drawings, there is illustrated therein a preferred embodiment of the invention as used in connection with a gas range provided with a closed cooking top 7 and an underlying oven 8. The latter contains a thermostat (not shown) controlled by a dial 9 arranged at the upper right-hand side of the oven. As shown, the dial 9 is provided only with customary temperature graduations and indications, although the latter may be made larger than before because of the increased space afforded.

A tablet 11 is provided on which are listed foods, as desired, and in adjoining columns the temperatures and periods of time required for the various operations of cooking the respective foods. This tablet 11, or cooking chart as it may now be called, is movably mounted under the top of a conventional form of shelf 12 extending from the top 7 of the range and provided with a depending flange 13, the top surface of the shelf 12 being flush with the top surface of the range, thereby permitting free sliding of utensils on the cooking top and its extension shelf.

While the movable mounting of the chart 11 may be accomplished in divers ways and by the use of various means, in the embodiment of the invention illustrated in the drawings the shelf 12 is formed on its under surface with a pair of depending ribs 14 spaced apart a distance sufficient to permit the free movement back and forth between them of the chart, see Fig. 5, and being of a length sufficient properly to guide the chart in such back and forth movements, see Figs. 3 and 4. To keep the chart 11 in place, as shown, a plate 16 is fastened by means of screws 17 to the ribs 14, see Fig. 4, the plate bridging laterally the space between the ribs 14 and being long enough to furnish a secure support for the chart. The depending flange 13 is formed with a slit or aperture 18 therein through which the chart may pass in its forward and backward movements.

It will be seen that the chart, which with its reading matter can be made as large as desired, may be brought forward from under the shelf 12 to the extent necessary for an inspection of any portion of its reading matter and, being flat, every portion of the exposed reading surface will be in plain view. When not in use, the chart may be pushed back under the shelf, where it will be out of the way and protected from injury or accumulation of dust and dirt. As preferred, the chart 11 is arranged under the forward part of the shelf 12 immediately above the dial 9 so that it can esaily be read in connection with said dial.

It is to be noted also that in the embodiment of the invention illustrated in the drawings, the portion of the flange 13 forming the upper edge 19 of the slit 18 extends across the chart 11 in a direction at right angles to the length of the chart and parallel to the lines of reading matter on the same and in close proximity thereto. Thus it will be seen, the edge 19 serves as an indicator to the reading matter which lies beneath it, and in use the chart may be set with relation to the edge 19 so that the line of reading matter on the chart indicating the temperature for any desired operation will be situated immediately adjacent said edge, which latter will act as a constant indicator while said line remains in set position. The utility of the edge 19 as an indicator is increased because of the fact that the reading matter on that portion of the chart beyond the said edge 19 and under the shelf 12 is not visible.

It will be understood that the chart need not be confined to the particular shape shown in the drawings, nor to the described method or reciprocating the same in order to expose any portion of it, and it will be further understood that the edge 19 of the aperture 18 forming the indicator to the reading matter may be of any desired configuration to conform to any particular outline which the lines of reading matter may take.

In order that the chart may be conveniently operated, the front portion thereof is bent downwardly to form a handle 20 by means of which the chart may be moved back and forth. This handle also serves the additional purpose of limiting the rearward movement of the chart. To prevent the chart from being pulled forwardly entirely out of engagement with the shelf 12, its rear portion is similarly bent downwardly to form a flange 21 which serves to arrest the forward movement of the chart.

It may be desirable to attach the shelf 12 to the opposite or left-hand side of the range, in which case the positions of the shelf 12 will be reversed and the chart 11 will be situated under what will now be the rear portion of the shelf. To meet this situation, preferably and as shown, the opposite end portion of the shelf 12 is arranged so that a chart may be stationed therebeneath and brought forward for use when desired. As shown, see Fig. 4, the shelf 12 at said opposite end portion is formed with depending ribs 22 (one only being shown) fashioned and spaced apart in manner similar to the ribs 14, and moreover is formed with a second slit 23 in the end flange 24. It will now be seen that, if desired, the plate 16 may be disengaged from the ribs 14 and fastened to the ribs 22, the chart 11 being arranged therebetween as in its former position.

It may be noted that the extension shelf is made of cast iron, whereas the cooking charts or plates are made of a different metal, which may be bronze, aluminum, or any other metal suited to the production of clear, well defined characters for the reading matter. In practise, the charts, whether die-castings or stamped or printed plates, should preferably stand out in contrast to the cast iron shelf, so that the reading matter will be more prominently and clearly discernible.

It may also be noted that the charts may be readily removed and replaced by other similar charts, if desired, thus adapting the dial without change to be used for the cooking of foods of all kinds within the temperature limits of the dial.

The invention in its broader aspects is not limited to the precise construction shown and described, nor to any particular construction by which the same has been and may be carried out, as changes may be made in the details thereof without departing from the main principles of the invention or sacrificing any of its chief advantages.

I claim:

1. In or for a gas range, a shelf adapted to be affixed on one side of said range and present a top surface flush with the top surface of said range so that articles may be slid from one of said surfaces to the other, means beneath said shelf arranged to support a cooking chart, and covering means arranged at the ends and free side of said shelf and having an aperture formed in said covering means at one of said ends, an edge of said aperture being adapted to serve as a reading guide, whereby said cooking chart may be concealed beneath said shelf and freely withdrawn thru said aperture for reading.

2. In or for a gas range a shelf adapted to be affixed on either of the opposite sides of said range and present a top surface flush with the top surface of said range so that articles may be slid from one of said surfaces to the other, said shelf being formed with depending flanges at its ends and free side and with slots formed in said ends, and means beneath said shelf for supporting a cooking chart, whereby said chart may be concealed beneath said shelf and freely withdrawn for reading through one of said slots, the edge of said slot being adapted to serve as a reading guide, and whereby on transferring the shelf to the opposite side of said range said chart can be arranged beneath said shelf and withdrawn for reading through the other of said slots.

In testimony whereof, I have affixed my signature hereto.

HENRY WATKINS O'DOWD.